(12) United States Patent
Masuko

(10) Patent No.: US 10,553,205 B2
(45) Date of Patent: Feb. 4, 2020

(54) SPEECH RECOGNITION DEVICE, SPEECH RECOGNITION METHOD, AND COMPUTER PROGRAM PRODUCT

(71) Applicant: Kabushiki Kaisha Toshiba, Tokyo (JP)

(72) Inventor: Takashi Masuko, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 157 days.

(21) Appl. No.: 15/689,775

(22) Filed: Aug. 29, 2017

(65) Prior Publication Data

US 2018/0261210 A1  Sep. 13, 2018

(30) Foreign Application Priority Data

Mar. 9, 2017 (JP) ................. 2017-045210

(51) Int. Cl.
*G10L 15/00* (2013.01)
*G10L 15/08* (2006.01)
*G10L 15/26* (2006.01)
*G10L 19/00* (2013.01)
*G10L 15/06* (2013.01)
*G06N 20/00* (2019.01)
(Continued)

(52) U.S. Cl.
CPC .............. *G10L 15/08* (2013.01); *G06N 20/00* (2019.01); *G10L 15/063* (2013.01); *G10L 15/265* (2013.01); *G10L 19/0018* (2013.01); *G10L 15/02* (2013.01); *G10L 15/22* (2013.01)

(58) Field of Classification Search
CPC combination set(s) only.
See application file for complete search history.

(56) References Cited

U.S. PATENT DOCUMENTS

| 8,244,522 B2 | 8/2012 | Nakano et al. |
| 9,230,541 B2 | 1/2016 | Ll et al. |
| 2015/0058018 A1 | 2/2015 | Georges et al. |

FOREIGN PATENT DOCUMENTS

| JP | 10-171489 | 6/1998 |
| JP | 2008-293019 | 12/2008 |

OTHER PUBLICATIONS

Yu Nasu, Hiroshi Fujimara, "Acoustic event detection and removal using LSTM-CTC for speech recognition", IEICE Technical Report, vol. 116, No. 208, PRMU2016-69 pp. 121-126, Sep. 2016.
(Continued)

*Primary Examiner* — Vu B Hang
(74) *Attorney, Agent, or Firm* — Finnegan, Henderson, Farabow, Garrett & Dunner, L.L.P.

(57) ABSTRACT

A speech recognition device includes one or more processors configured to calculate a score vector sequence on the basis of a speech signal, search a search model to detect a path following the input symbol from which a likely acoustic score in the score vector sequence is obtained, and output an output symbol allocated to the detected path. The symbol set includes a symbol representing a phonetic unit to be recognized, and an additional symbol representing at least one of a filler, a disfluency, and a non-speech sound. A search model includes an input symbol string arranged one or more input symbols, and paths to which output symbols are allocated. When the additional symbol is received as the input symbol from which the likely acoustic score is obtained, the processors start searching for a path associated with a new output symbol from a next score vector.

20 Claims, 11 Drawing Sheets

(51) Int. Cl.
    *G10L 15/02*    (2006.01)
    *G10L 15/22*    (2006.01)

(56) References Cited

OTHER PUBLICATIONS

Yuji Matsumoto, Yasuharu Den, "Morphological Analysis of Spoken Japanese", SLP, vol. 2001, No. 54 (2001-NL-143), pp. 49-54, May 2001.

Takaaki Hori, Hajime Tsukada, "Of the special feature speech information processing technique it is the highest Speech recognition with the finite state transducer with the heaviness", IPSJ Magazine, vol. 45, No. 10, pp. 1020-1025, Oct. 2004.

Yichuan Tang, "Deep Learning using Linear Support Vector Machines", arXiv:1306.0239v4 [cs.LG] Feb. 2015.

SPEECH RECOGNITION DEVICE, SPEECH RECOGNITION METHOD, AND COMPUTER PROGRAM PRODUCT

CROSS-REFERENCE TO RELATED APPLICATIONS

This application is based upon and claims the benefit of priority from Japanese Patent Application No. 2017-045210, filed on Mar. 9, 2017; the entire contents of which are incorporated herein by reference.

FIELD

Embodiments described herein relate generally to a speech recognition device, a speech recognition method, and a computer program product.

BACKGROUND

Acoustic models capable of evaluating fillers, disfluencies, and non-speech sounds at the same time as phonetic units are known. A speech recognition system to which such an acoustic model is applied is capable of removing fillers, disfluencies, and non-speech sounds in speech recognition, which increases recognition accuracy.

For correct recognition of fillers, disfluencies, and non-speech sounds, however, fragments including the fillers, the disfluencies, the non-speech sounds, and the like have to be registered as words in advance in a search model functioning as a recognition dictionary. Thus, in conventional speech recognition systems, a very high cost is required to register such fragments as words in a search model.

DETAILED DESCRIPTION

Figure 1:
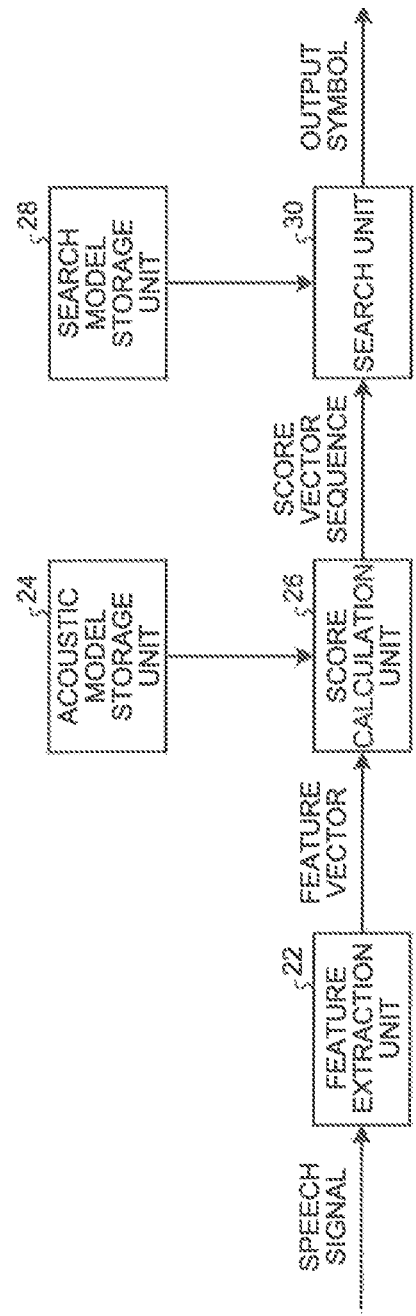
FIG. 1 is a configuration, diagram of a speech recognition device according to an embodiment.

According to an embodiment, a speech recognition device outputs an output symbol representing linguistic information contained in a speech signal. The device includes one or more processor configured to calculate a score vector sequence based on the speech signal, the score vector sequence being an arrangement of score vectors including an acoustic score of each of input symbols being elements of a predetermined symbol set; and search a search model registered in advance, to detect a path following the input symbol from which a likely acoustic score in the score vector sequence is obtained, and output an output symbol allocated to the detected path in the search model. The symbol set includes, as the input symbol, a symbol to be recognized representing a phonetic unit to be recognized, and an additional symbol representing at least one of a filler, a disfluency, and a non-speech soused. The search model includes an input symbol string arranged one or more input symbols, and a plurality of paths to each of which an output symbol is allocated. When the additional symbol is received as the input symbol from which the likely acoustic score is obtained, the one or more processors start searching for a path associated with a new output symbol from a next score vector after the score vector including the received additional symbol.

An embodiment will be described below in detail with reference to the drawings. A speech recognition device 10 according to the embodiment recognizes speech signals containing fillers, disfluencies, and non-speech sounds as well as phonetic units with high accuracy and at a low cost. The speech recognition device 10 then outputs output symbols representing linguistic information obtained through speech recognition.

Definition

First, terms used in the embodiment will be explained.

Acoustic information refers to information contained in a speech signal. Acoustic information includes phonetic units, tillers, disfluencies, non-speech sounds, and soundlessness information.

A phonetic unit is a unit of sound in a language, which is added in a speech signal by a speaker's utterance of the language. Examples of phonetic units include phonemes, syllables, phonemes in units of morae, subwords, characters, and words. In Japanese language, a phonetic unit may correspond to a kana (a character of the Japanese syllabary). In English language, a phonetic unit may correspond to a phonetic symbol or an alphabetic character. Soundlessness such as a geminate consonant of the Japanese language may also be included in a phonetic unit.

A filler is a sound like an interjection that conditions a speech, is inserted between words owing to interruption or delay of thought, or indicates the presence of following words.

A disfluency is a sound contained in a speech signal when a falter occurs because of failure in utterance, when a term or an expression is restated, or when a term or an expression is repeated. For example, a speaker may utter part of a word to say next and then restate the word, or may interrupt in the middle of a sentence and then restate the sentence. A sound contained in a speech signal when restatement or repetition has occurred is often a part of pronunciation of the beginning of a word to be said next, a sound similar to the part of pronunciation, or part of a word having a similar meaning. Information presented by such a sound is often a word fragment that is grammatically meaningless, and removal of such a sound from a recognition result often has no influence in the meaning. Such a sound is referred to as a disfluency.

A non-speech sound is a sound of a cough, a sneeze, a yawn, laughter, a cry, a breath sound, or the like, which is not produced when a speaker utters a language.

Soundlessness information is information showing sound (such as silence or noise) contained in a speech signal in a state in which the speech signal contains none of phonetic units, fillers, disfluencies, and non-speech sounds.

An input symbol is a symbol representing acoustic information. A symbol set is a set including input symbols as elements. A symbol set is defined in advance. A symbol set includes, as input symbols, at least one symbol to be recognized, at least one additional symbol, and a symbol not to be recognized.

A symbol to be recognized is a symbol representing a phonetic unit to be recognized. A symbol set may include, as symbols to be recognized, characters corresponding to all of the phonetic units that can be contained in a speech signal (for example, all the phonetic symbols). In addition, in a case where the speech recognition device 10 recognizes only specific words (for example, in a case where the speech recognition device 10 recognizes only "hello"), the characters corresponding to the phonetic units necessary for recognizing the specific words may be included as the symbols to be recognized. For recognition of soundlessness information, soundless symbols representing soundless information may be included as one type of the symbols to be recognized in the symbols to be recognized.

An additional symbol is one type of the input symbols, and is a symbol representing a filler, a disfluency and/or a non-speech sound. A symbol set may include three types of additional symbols respectively representing a filler, a disfluency, and a non-speech sound. A symbol set may include one or two types of additional symbols representing any one or two of a filler, a disfluency, and a non-speech sound. Furthermore, a symbol set may include an additional symbol collectively representing two or three of a filler, a disfluency, and a non-speech sound. Furthermore, a symbol set may include, as additional symbols representing non-speech sounds, different symbols respectively representing a cough, a sneeze, a yawn, laughter, a cry, a breath sound, and the like.

A symbol not to be recognized is one type of the input symbols, and is a symbol indicating that acoustic information that is contained in a speech signal among the acoustic information represented by symbols to be recognized and additional symbols is not determined. In other words, a symbol not to be recognized is a symbol indicating that the speech recognition device 10 is yet to recognize a symbol to be recognized or an additional symbol.

An input symbol string is a sequence of likely input symbols obtained through recognition of a speech signal. The speech recognition device 10 may generate one input symbol string for one speech signal. Alternatively, the speech recognition device 10 may generate M (M is an integer of 2 or larger) input symbol strings for one speech signal.

An output symbol represents linguistic information that is a result of recognition of a speech signal. An output symbol may be a word, a character, a subword, or the like. An output symbol is generated on the basis of a symbol to be recognized included in an input symbol string. The speech recognition device 10 may generate a plurality of output symbols arranged in time series from one input symbol string.

Description of Speech Recognition Device 10

FIG. 1 is a diagram illustrating a configuration of the speech recognition device 10 according to the embodiment. The speech recognition device 10 includes a feature extraction unit 22, an acoustic model storage unit 24, a score calculation unit 26, a search model storage unit 28, and a search unit 30.

The feature extraction unit 22 acquires a speech signal to be recognized. The feature extraction unit 22 acquires a speech signal detected by a sound collector, for example.

The feature extraction unit 22 analyses the speech signal in units of a frame, and calculates a feature vector for each frame. A feature vector includes a plurality of types of feature quantities representing features of speech. A frame is a section, of a speech signal for calculation of one feature vector. Frames are set to have central times shifted at predetermined intervals. Furthermore, frames have time lengths equal to one another, for example. The section of each frame may partially overlap with that of another frame.

The acoustic model storage unit 24 stores an acoustic model. An acoustic model is data used by the score calculation unit 26 for pattern recognition of a speech signal. An acoustic model is appropriately trained by a learning device prior to recognition of a speech signal performed by the speech recognition device 10. The acoustic model storage unit 24 may be implemented by a server on a network, for example.

The score calculation, unit 26 calculates a score vector sequence constituted by an arrangement of a plurality of score vectors, by using an acoustic model stored in the acoustic model storage unit 24, on the basis of the feature vectors calculated for respective frames by the feature extraction unit 22. Each score vector includes an acoustic score of each input symbol, which is an element of a predetermined symbol set.

Each of the acoustic scores included in the score vectors is associated with an input symbol. An acoustic score represents the likelihood of acoustic information represented by the associated input symbol being included in a speech signal. Note that the acoustic information included in a speech signal and the acoustic information represented by an input symbol need not be in frame synchronization (time synchronization) with each other. Specifically, the acoustic information represented by an input symbol may be delayed from the acoustic information included in a speech signal. For example, the acoustic information represented by an input symbol associated with the best acoustic score among acoustic scores included in the score vectors calculated by the score calculation unit 26 in response to input of the feature vector of a 15th frame may be included in first to tenth frames.

For example, an acoustic score may be such that the acoustic information represented by an input symbol associated with the acoustic score is a probability, a likelihood, a log likelihood, or a log probability included in a speech signal. An acoustic score may be better (that is, more likely) as the value of the acoustic score is larger, or may be better as the value of the acoustic score is smaller. For example, an acoustic score that is a probability, a likelihood, a log probability, or a log likelihood is better as the value of the acoustic score is larger. Alternatively, for example, an acoustic score that is a sign-inverted log probability or a sign-inverted log likelihood is better as the value of the acoustic score is smaller. Alternatively, an acoustic score that is a certain distance between a speech signal (feature vector) and an acoustic model is better as the value of the acoustic score is smaller.

A score vector sequence is information of an arrangement of a plurality of score vectors. The score calculation unit 26 provides the calculated score vector sequence to the search unit 30. Note that the feature extraction unit 22 and the score calculation unit 26 correspond to a calculation unit that calculates a score vector sequence on the basis of a speech signal.

The search model storage unit 28 stores a search model. A search model includes an input symbol string constituted by an arrangement of one or more input symbols, and a plurality of paths to which output symbols are allocated. A search model is data for generation of an input symbol string and output symbols from a score vector sequence, and is used by the search unit 30. A search model is a weighted finite state transducer (WFST), for example. A search model is appropriately trained by a learning device prior to recognition of a speech signal performed by the speech recognition device 10. The search model storage unit 28 may be implemented by a server on a network, for example.

The search unit 30 searches the search model stored in the search model storage unit 28 to detect a path following an input symbol from which a likely acoustic score in the score vector sequence calculated by the score calculation unit 26 is obtained. The search unit 30 acquires the input symbol string and the output symbol allocated to the detected path in the search model. The search unit 30 then outputs the output symbol allocated to the detected path in the search model.

Furthermore, when the search unit 30 has received an additional symbol as an input symbol from which a likely acoustic score is obtained during search of a search model, the search unit 30 starts searching for a path associated with a new output symbol from the next score vector after the score vector including the received additional symbol. In other words, when the search unit 30 has received an additional symbol as an input symbol from which a likely acoustic score is obtained during search of a search model, the search unit 30 terminates searching for the current path and starts searching for the next path.

Figure 2:
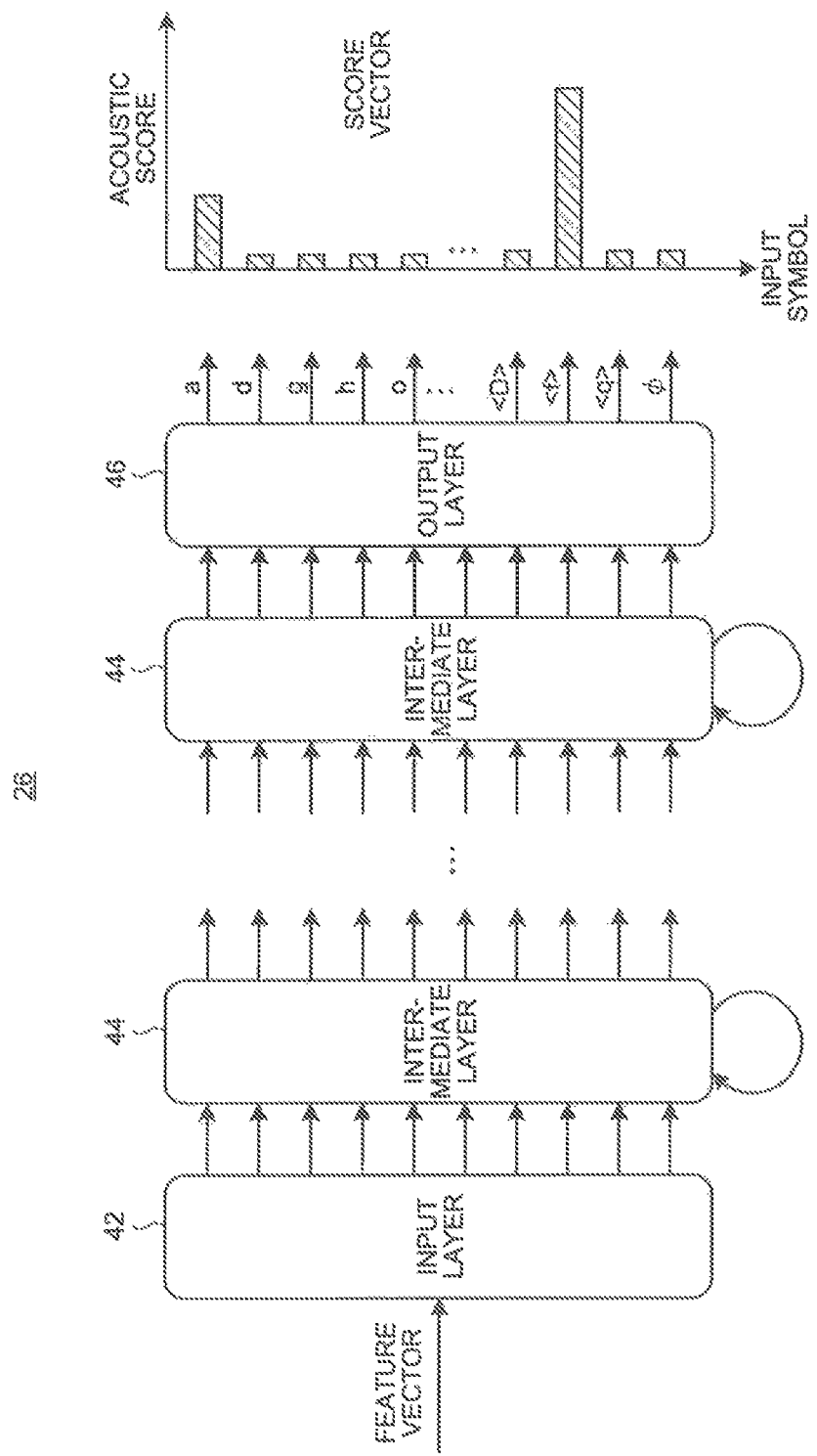
FIG. 2 is a diagram illustrating an example of a configuration of a score calculation unit.

FIG. 2 is a diagram illustrating an example of a configuration of the score calculation unit 26. The score calculation unit 26 may be a recurrent neural network (RNN) to which connection list temporal classification (CTC) is applied as illustrated in FIG. 2, for example.

For example, the score calculation unit 26 includes an input layer 42, at least one intermediate layer 44, and an output layer 46. Each of the input layer 42, the intermediate layers 44, and the output layer 46 performs a process of acquiring at least one signal, a process of computation of the acquired signal, and a process of outputting at least one signal.

The input layer 42, the at least one intermediate layer 44, and the output layer 46 are connected in series. The input layer 42 receives a feature vector and performs a computation process. The input layer 42 then outputs at least one signal obtained as a result of the computation to the subsequent intermediate layer 44. Each of the intermediate layers 44 performs a computation process on the at least one signal received from the layer upstream thereof. Each of the intermediate layers 44 then outputs at least one signal obtained as a result of the computation to the subsequent intermediate layer 44 or output layer 46. Each of the intermediate layers 44 may further have a feedback path through which the signal is returned by the intermediate layer 44 itself.

The output layer 46 performs a computation process on the signal received from the intermediate layer 44 upstream thereof. The output layer 46 then outputs a score vector as a result of the computation. The output layer 46 outputs signals, the number of the output signals corresponding to the number of input symbols. The signals output from the output layer 46 are respectively associated with the input symbols. For example, the output layer 46 performs computation using a softmax function.

In addition, parameters to be used in computation by the respective layers are provided from the acoustic model stored in the acoustic model storage unit 24. The acoustic model is trained in advance by the learning device so as to output acoustic scores of respective input symbols included in a predetermined symbol set on the basis of the feature vector. Specifically, the acoustic model is trained by the learning device so as to output the acoustic scores of at least one symbol to be recognized representing a phonetic unit to be recognized, an additional symbol representing at least one of a filler, a disfluency and/or a non-speech sound, and a symbol not to be recognized representing an acoustic score not to be recognized.

In this manner, the score calculation unit 26 is capable of simultaneously outputting the acoustic scores of the respective input symbols included in a symbol set. In other words, the score calculation unit 26 is capable of simultaneously outputting the acoustic scores of the symbol to be recognized, the additional symbol, and the symbol not to be recognized.

Note that the score calculation unit 26 may be a network called a long short-term memory, which is an extension of the RNN, instead of the RNN. Furthermore, the output layer 46 may use a support vector machine instead of the softmax function.

Figure 3:
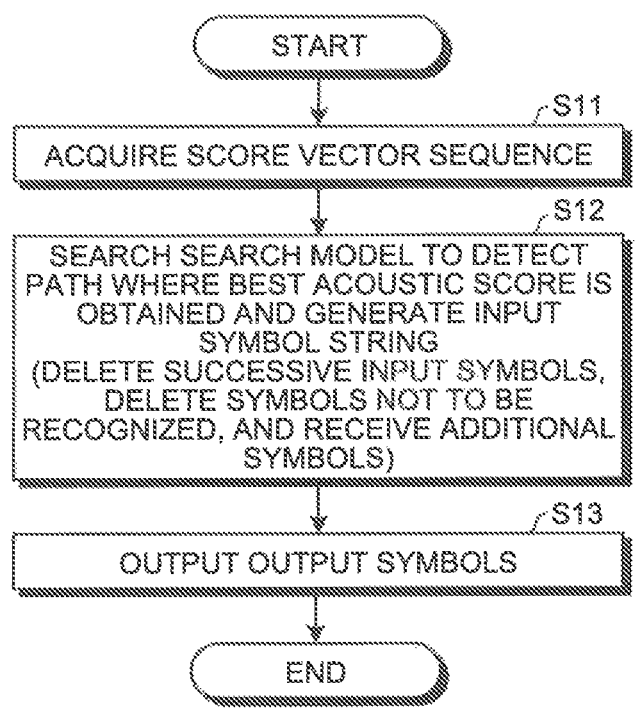
FIG. 3 is a flowchart illustrating a process flow of a search unit.

FIG. 3 is a flowchart illustrating a process flow of the search unit 30. The search unit 30 performs processes according to procedures illustrated in FIG. 3, for example.

First, in S11, the search unit 30 acquires a score vector sequence.

Subsequently, in S12, the search unit 30 searches a search model such as a WFST to detect a path of an input symbol from which a likely acoustic score in the score vector sequence is obtained, and generates an input symbol string allocated to the detected path. For example, the search unit 30 uses a search model such as the WFST to search for the best path by a Viterbi algorithm or the like, and generates the input symbol string. Note that the search unit 30 may detect a path of an input symbol from which a likely acoustic score is obtained by using a search model combining an acoustic model, a word dictionary, and a language model, acoustic score to search for the path.

Note that, in the search process in S12, the search unit 30 detects a part of an input symbol string where a plurality of successive symbols to be recognized are present. Upon detecting a part where a plurality of successive symbols to be recognized are present, the search unit 30 then keeps any one of the successive input symbols and deletes the others. In this manner, the search unit 30 avoids redundant recognition of the same phonetic units. Furthermore, in the search process in S12, after keeping one of the successive symbols to be recognized, the search unit 30 deletes symbols not to be recognized from the input symbol string.

Furthermore, in the search process in S12, when the search unit 30 has received an additional symbol as an input symbol from which a likely acoustic score is obtained, the search unit 30 starts searching for a path associated with a new output symbol from the next score vector after the score vector including the received additional symbol. In other words, when the search unit 30 has received an additional symbol as an input symbol from which a likely acoustic score is obtained during search of a search model, the search unit 30 forcibly terminates searching for the current path and starts searching for the next path.

Subsequently, in S13, the search unit 30 generates and outputs an output symbol each time the search for a path, is terminated. For example, each time a search for a path is terminated, the search unit 30 acquires an output symbol allocated to the path associated with the generated input symbol string from the search model. The search unit 30 then outputs the output symbol acquired from the search model.

Note that, when the search model is the WFST, the search unit 30 performs the processes in S12 and S13 at the same time. For example, the search unit 30 performs the processes of searching the search model to detect a path following an input symbol from which a likely acoustic score in the score vector sequence is obtained and outputting the output symbol allocated to the detected path at the same time.

Examples of Search

Next, processes in a case where the WFST for recognizing the English language is used as the search model will be described with reference to FIGS. 4 to 10.

Single circles illustrated in the figures represent the states of the WFST. A number in each single circle is a number for identifying a state. The 0-th state represents an initial state. A double circle with an "E" therein represents an end state. An arrow connecting a state with a state represents an edge (transition).

Symbols on the left of ":" of characters attached to the arrows represent input symbols allocated to the respective edges. Symbols on the right of ":" of the characters attached to the arrows represent output symbols allocated to the respective edges.

When a score vector is provided, the search unit 30 receives a likely input symbol. Then, when search unit 30 has received, in a certain state, an input symbol allocated to an edge coming from a certain state, for example, the search unit 30 shifts the state according to the edge.

Furthermore, when the search unit 30 has shifted the state, the search unit 30 outputs the output symbol allocated to the edge, for example. Note that ε is a symbol representing null. When ε is allocated as an output symbol, the search unit 30 outputs no output symbol or outputs an output symbol representing null.

The WFST illustrated in FIGS. 4 to 10 has registered therein five paths (#1 to #5) as shown in Table 1 below. In the WFST, an input symbol string and an output symbol as shown in Table 1 below are allocated to each of the paths.

TABLE 1

| Path | | Input symbol string | Output symbol |
|---|---|---|---|
| #1 | 0→1→2→3→4→5→E | mə ker | McKay |
| #2 | 0→6→7→E | er | A |
| #3 | 0→8→E | ə | uh |
| #4 | 0→9→10→11→12→13→E | stri:t | street |
| #5 | 0→9→10→14→15→16→17→E | stə mə k | stomach |

Figure 4:
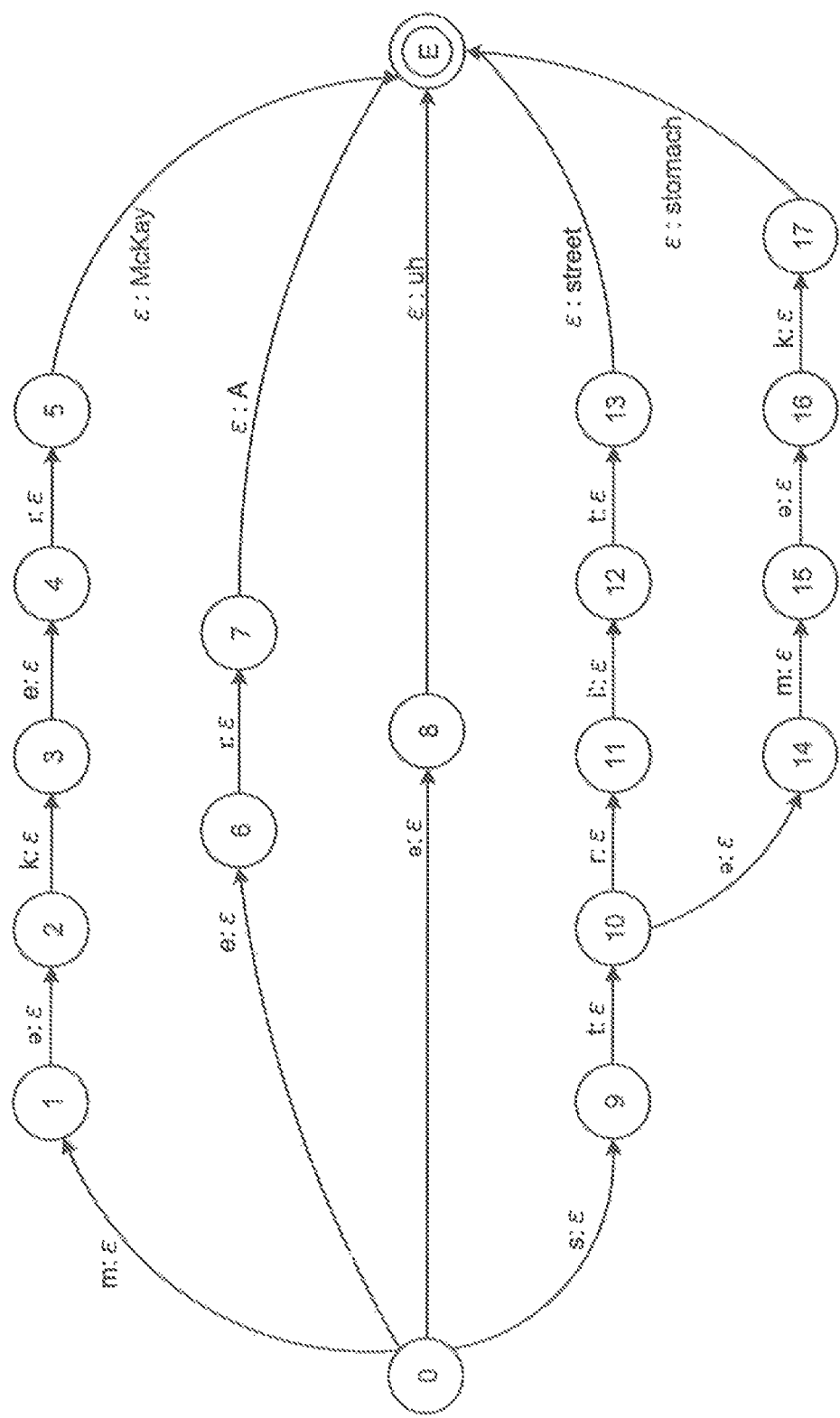
FIG. 4 is a diagram illustrating a search model for recognizing English speech.

FIG. 4 is a diagram illustrating an example of the search model for recognizing English speech in a case where the input symbols do not include additional symbols.

When the search unit 30 has received the input symbol string shown on the first path (#1) in Table 1, for example, the search unit 30 shifts the state to follow 0→1→2→3→4→5. Upon receiving ε thereafter, the search unit 30 shifts the state to follow 5→E and outputs "McKay" as the output symbol.

When the search unit 30 has received the input symbol string shown on the second path (#2) in Table 1, for example, the search unit 30 shifts the state to follow 0→6→7. Upon receiving ε thereafter, the search unit 30 shifts the state to follow 7→E and outputs "A" as the output symbol.

In addition, when the search unit 30 has received the input symbol string shown on the third path (#3) in Table 1, for example, the search unit 30 shifts the state to follow 0→8. Upon receiving ε thereafter, the search unit 30 shifts the state to follow 8→E and outputs "uh" as the output symbol.

In addition, when the search unit 30 has received the input symbol string shown on the fourth path (#4) in Table 1, the search unit 30 shifts the state to follow 0→9→10→11→12→13. Upon receiving ε thereafter, the search unit 30 shifts the state to follow 13→E and outputs "street" as the output symbol.

In addition, when the search unit 30 has received the input symbol string shown on the fifth path (#5) in Table 1, the search unit 30 shifts the state to follow 0→10→14→15→16→17. Upon receiving ε thereafter, the search unit 30 shifts the state to follow 17→E and outputs "stomach" as the output symbol.

Assume that the user pronounced as below when reading the characters "McKay Street". Note that D represents a disfluency.

TABLE 2

| Pronunciation | stDə Dmə keIstri:t |
|---|---|

A conventional search device cannot accept D when a search process is performed on such a speech signal with the WFST illustrated in FIG. 4. Thus, in this case, the conventional search device shifts the state to follow 0→9→10→14→15→16→17→E→0→6→7→E→0→9→10→11→12→13→E. As a result, the conventional search device would output "stomach A street" as the output symbol, which is false recognition.

Figure 5:
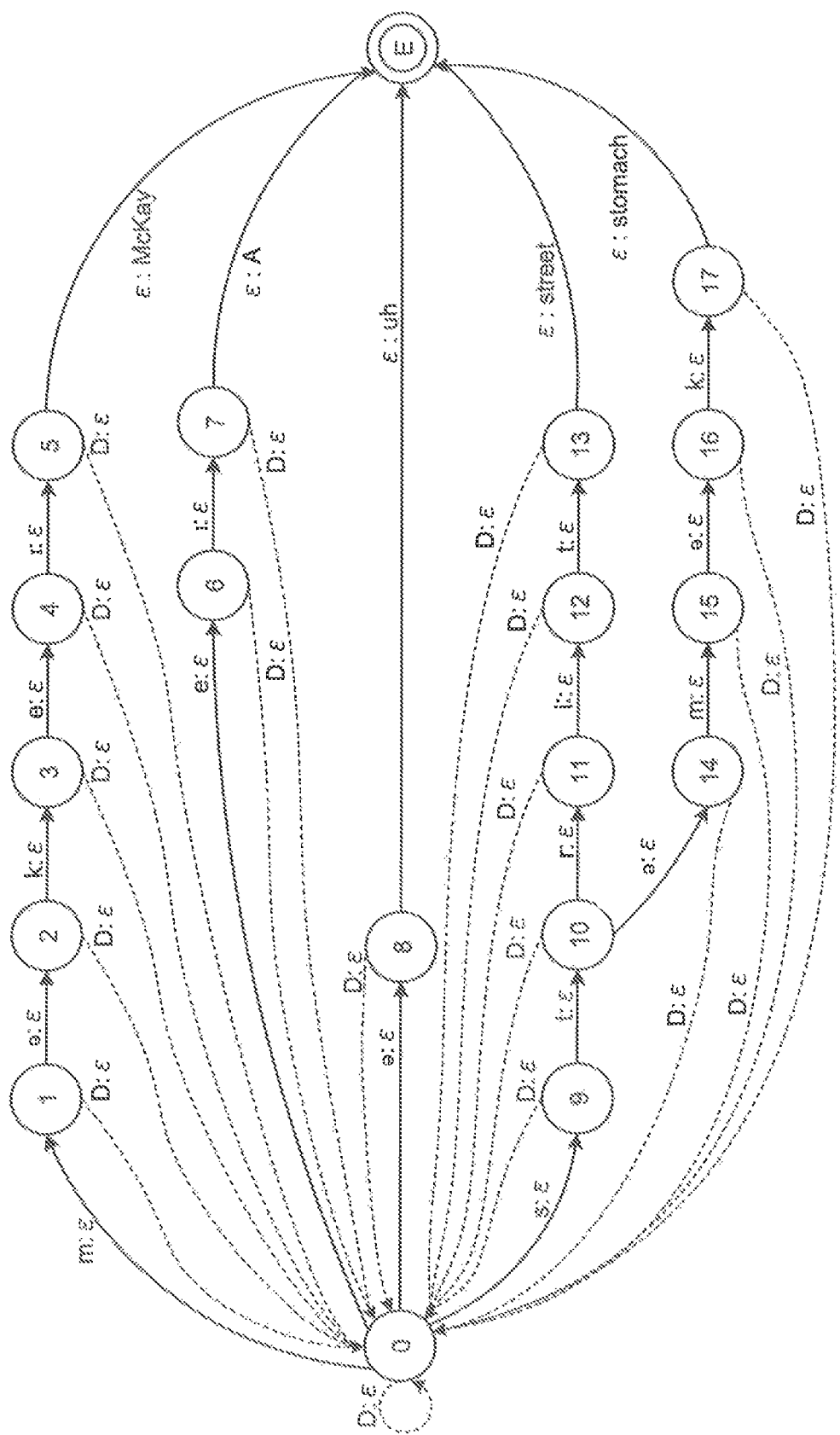
FIG. 5 is a diagram illustrating a search model in which reception of an additional symbol causes transition to a starting point.

FIG. 5 is a diagram illustrating an example of a search model for recognizing English speech, in which reception of an additional symbol causes transition to a path starting point.

In this regard, the search unit 30 receives an additional symbol representing at least one of a filler, a disfluency and a non-speech sound as an input symbol. When the search unit 30 has received an additional symbol, the search unit 30 then moves the search position to the starting point of the paths included in the search model. For example, in a case where the search model is WFST, the search unit 30 having received an additional symbol shifts the state of the path to an initial state of the WFST. This allows the search unit 30, having received the additional symbol, to start searching for a path associated with a new output symbol from the next score vector after the score vector including the received additional symbol.

For example, when the pronunciation as shown in Table 2 above is uttered, the search unit 30 can shift the state to follow 0→9→10→0→8→0→1→2→3→4→E→0→9→10→11→12→13→E. As a result, the search unit 30 is capable of outputting "McKay street" as the output symbol, which is correct recognition.

Note that, the example of FIG. 5 shows the WFST in which disfluencies (D) are allocated as input symbols, in the WFST, however, fillers or non-speech sounds may be allocated as input symbols. The same applies to FIG. 6 and subsequent figures.

In addition, a path for receiving an additional symbol may be added in advance in the search model, for example. For example, in a case where the search model is the WFST, a first edge connecting each of the states other than the end state with the initial state may be added in advance in the WFST. In this case, an additional symbol is allocated as an input symbol to each of the first edges. This allows the search unit 30 having received an additional symbol to shift the state of the path to the initial state in the WFST.

Alternatively, a path for receiving an additional symbol may not be added in the search model. In this case, the search unit 30 determines whether or not an additional symbol is received each time search for a path is processed. When the search unit 30 has received an additional symbol, the search unit 30 then forcibly moves the search position to the path starting point regardless of the paths in the search model. For example, in a case where the search model is WFST, the search unit 30 having received an additional symbol shifts the state of the path to the initial state in the WFST regardless of the edges in the WFST. This allows the search unit 30 having received an additional symbol to shift the state of the path to the initial state in the WFST.

Note that beginning information indicating the beginning may be added to the state at the beginning of each of words included in the search model. In this case, the search unit 30 having received an additional symbol may move the search position to the state where the beginning information is added. Alternatively, the search unit 30 may store the number representing the state at the beginning of each of the words included in the search model, and move the search position to the state with the stored number each time an additional symbol is received.

In addition, the search unit 30 having received an additional symbol may output no output symbol or may output an output symbol representing null. For example, in a case where a path for receiving an additional symbol is added in advance in the search model, a symbol (ε) representing null may be allocated to the output symbol of the path.

Figure 6:
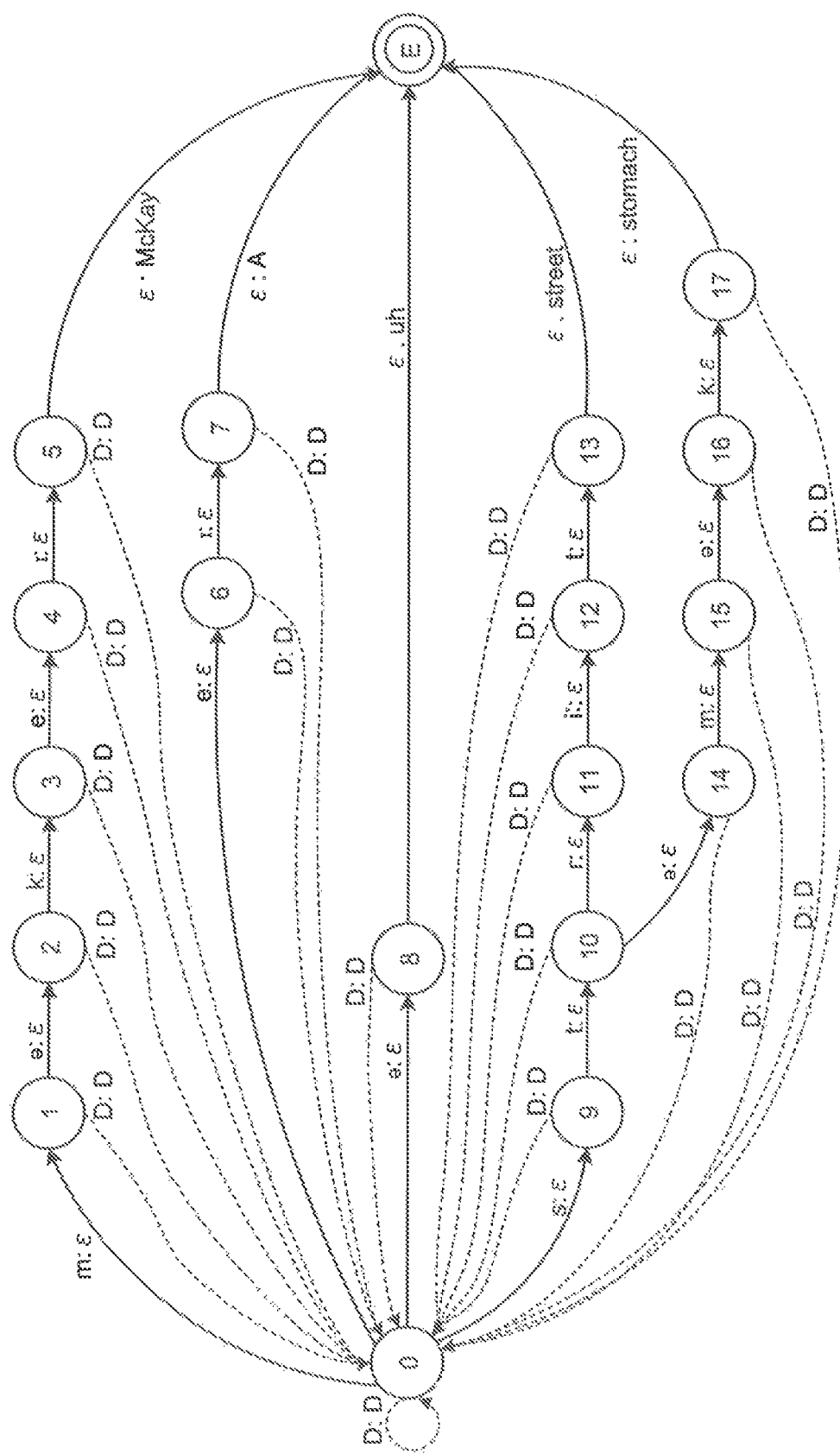
FIG. 6 is a diagram illustrating a search model that outputs a symbol representing an additional symbol.

FIG. 6 is a diagram illustrating an example of a search model for recognizing English speech, which outputs a symbol representing an additional symbol when the additional symbol has been received.

The search unit 30 having received an additional symbol may output a symbol representing the additional symbol. For example, in a case where a path for receiving an additional symbol is added in advance in the search model, a symbol representing the additional symbol may be allocated as the output symbol to the path.

For example, when the pronunciation as shown in Table 2 above is uttered, the search unit 30 outputs "D D McKay street" as an output symbol. This allows the search unit 30 to include the inclusion of the disfluencies in the recognition result.

Figure 7:
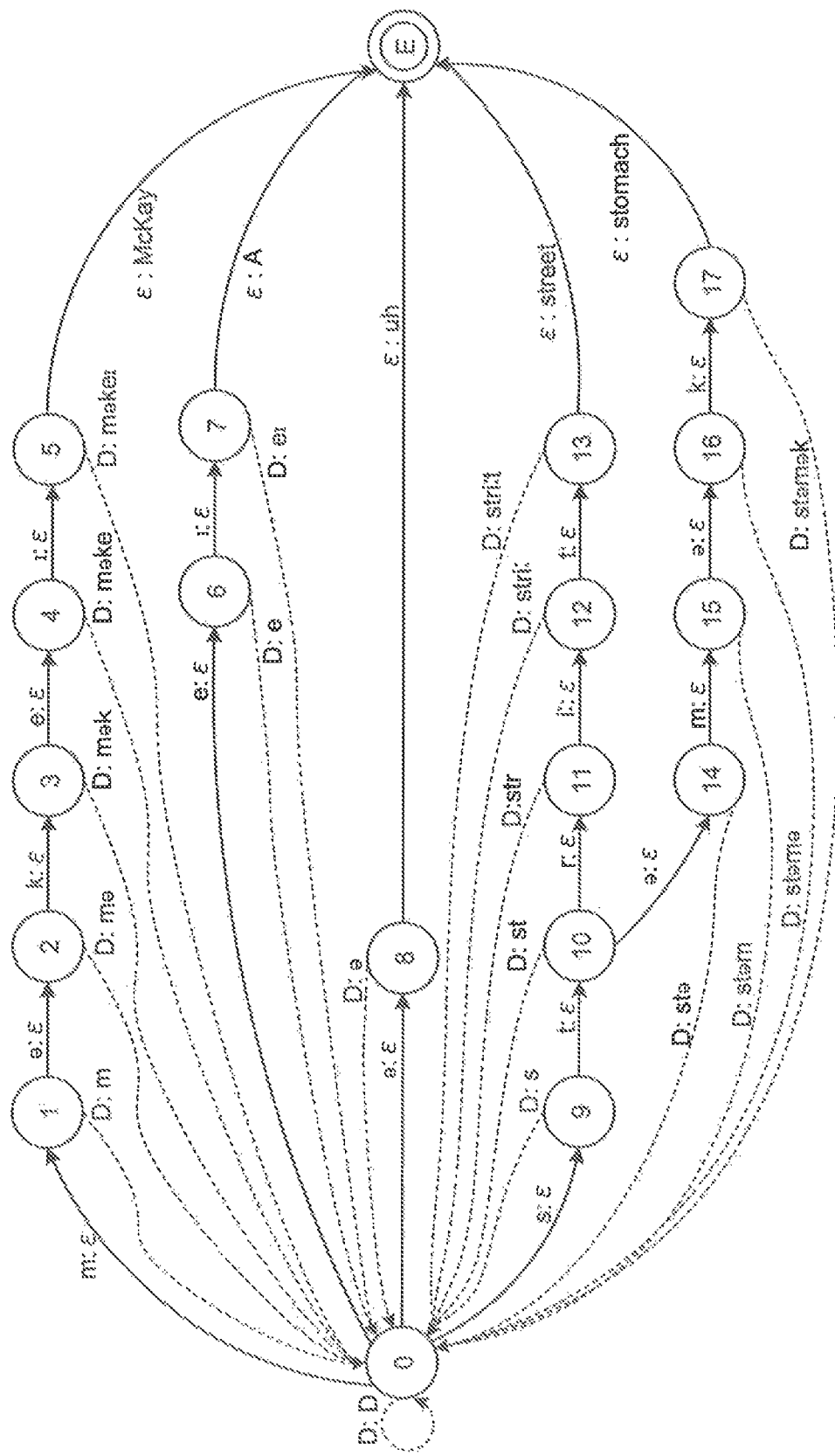
FIG. 7 is a diagram illustrating a search model that outputs an input symbol string.

FIG. 7 is a diagram illustrating an example of a search model for recognizing English speech, which outputs an input symbol string when an additional symbol has been received.

The search unit 30 having received an additional symbol may output an input symbol string received from the starting position of a path until the additional symbol is received. For example, in a case where a path for receiving an additional symbol is added in advance in the search model, an input symbol string received from the starting position until the additional symbol is received may be allocated as an output symbol to the path.

For example, when the pronunciation as shown in Table 2 above is uttered, the search unit 30 outputs an output symbol as shown in Table 3 below. This allows the search unit 30 to output a phonetic string of fragments for a part for which a recognition result cannot be determined, for example.

TABLE 3

| Output symbol | stə McKay street |
|---|---|

Figure 8:
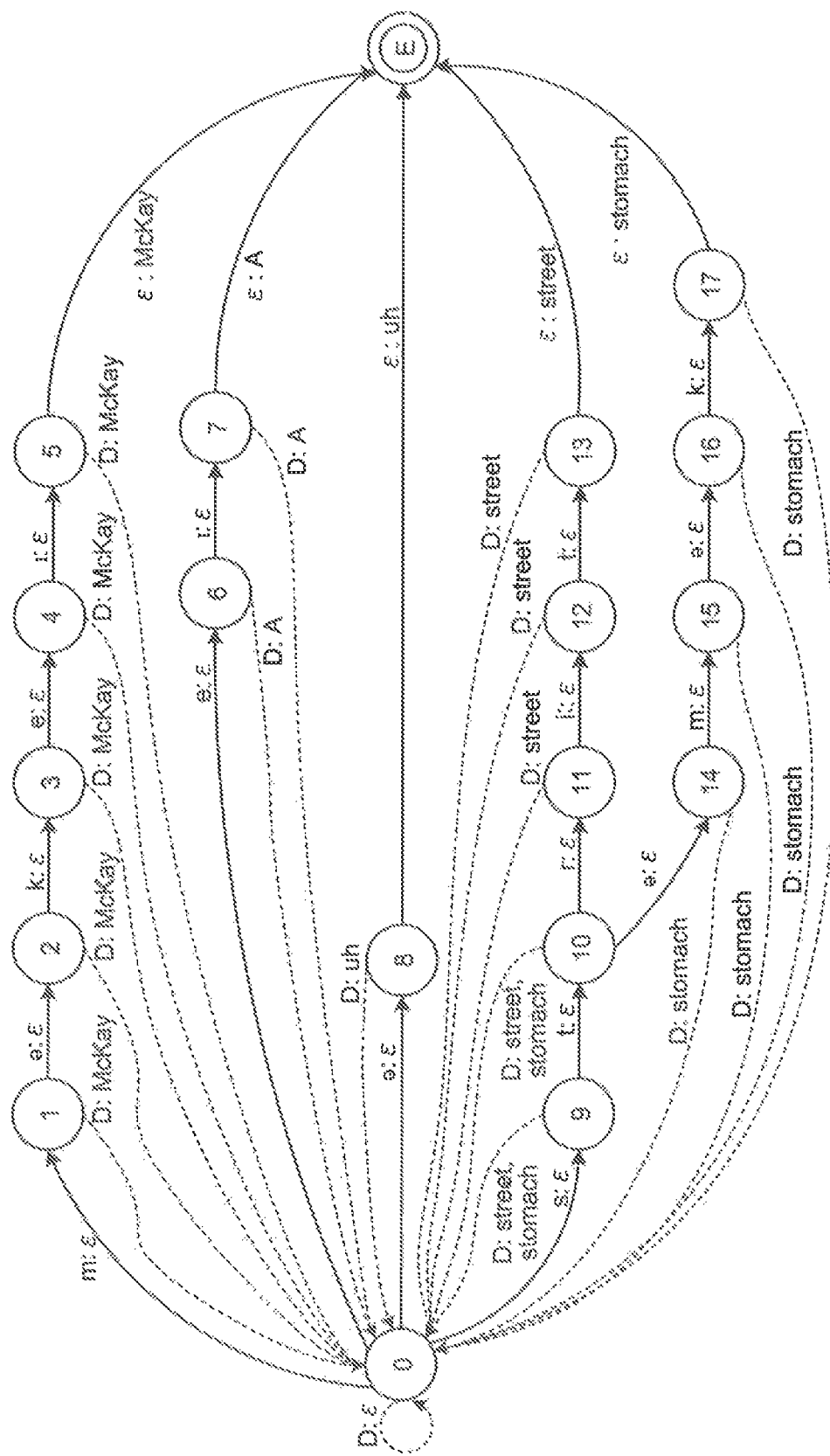
FIG. 8 is a diagram illustrating a search model that outputs an output symbol allocated to a path.
Figure 9:
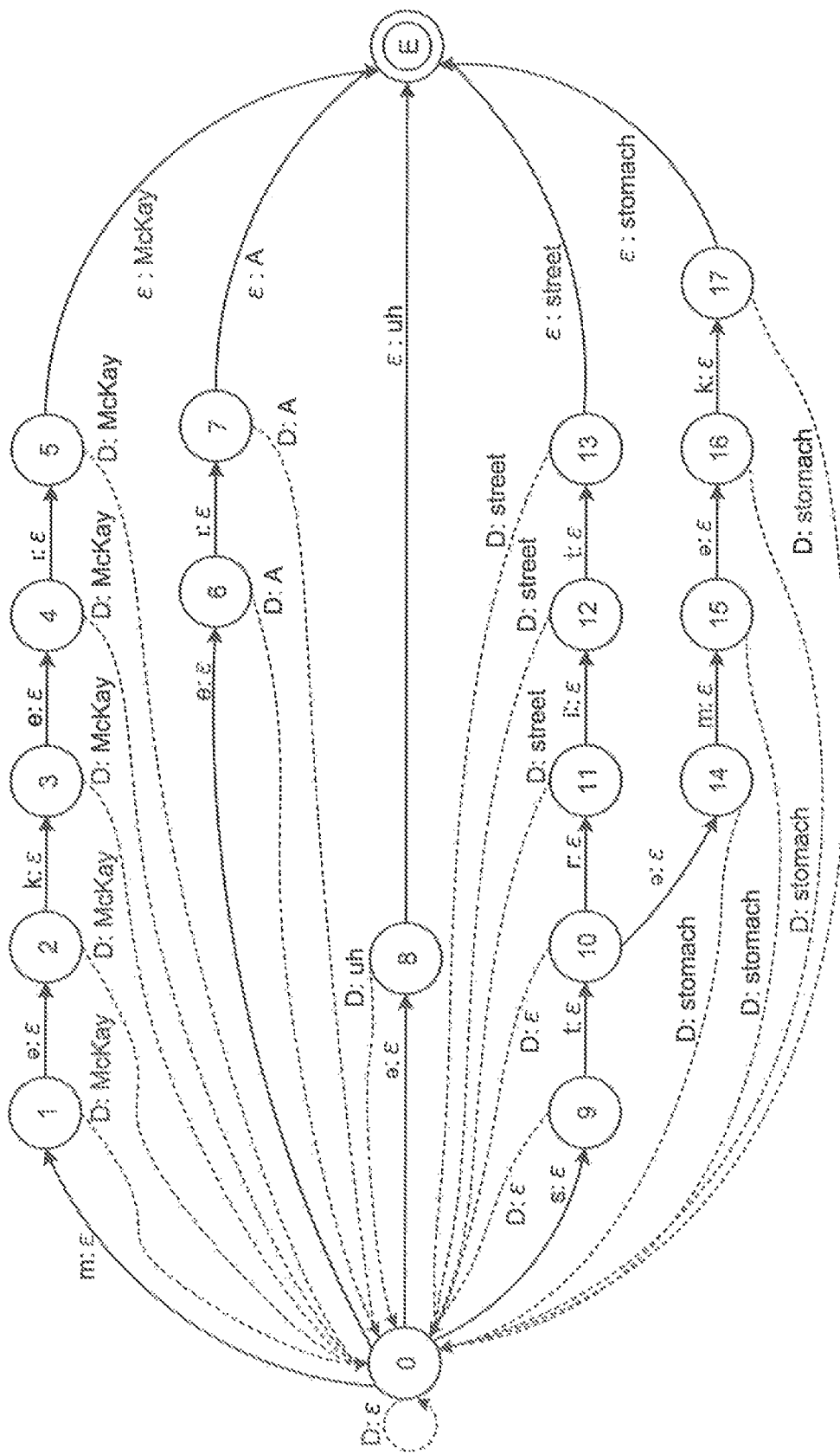
FIG. 9 is a diagram illustrating a search model that outputs an output symbol if determined.

FIG. 8 is a diagram illustrating an example of a search model for recognizing English speech, which outputs an output symbol allocated to a path when an additional symbol has been received.

The search unit 30 having received an additional symbol may output an output symbol of a path continuous with a path being followed until immediately before the additional symbol is received. For example, in a case where a path for receiving an additional symbol is added in advance in the search model, an output symbol of a path continuous with a path being followed until immediately before the additional symbol is received may be allocated as an output symbol to the added path.

For example, the output symbol allocated to the path continuous with the state of 1, 2, 3, 4, or 5 is "McKay". Thus, when the search unit 30 in the state of 1, 2, 3, 4, or 5 has received an additional symbol, the search unit 30 outputs "McKay".

For example, the output symbol allocated to the path continuous with the state of 6 or 7 is "A". Thus, when the search unit 30 in the state of 6 or 7 has received an additional symbol, the search unit 30 outputs "A".

For example, the output symbol allocated to the path continuous with the state of 8 is "uh". Thus, when the search unit 30 in the state of 8 has received an additional symbol, the search unit 30 outputs "uh".

For example, the output symbol allocated to the path continuous with the state of 11, 12, or 13 is "street". Thus, when the search unit 30 in the state of 11, 12, or 13 has received an additional symbol, the search unit 30 outputs "street".

For example, the output symbol allocated to the path continuous with the state of 14, 15, 16, or 17 is "stomach". Thus, when the search unit 30 in the state of 14, 15, 16, or 17 has received an additional symbol, the search unit 30 outputs "stomach".

For example, the output symbols allocated to the paths continuous with the state of 9 or 10 are "street" and "stomach". Thus, when the search unit 30 in the state of 9 or 10 has received an additional symbol, the search unit 30 outputs "street" and "stomach".

FIG. 3 is a diagram illustrating an example of a search model for recognizing English speech, which outputs an output symbol, if the output symbol has been determined, when an additional symbol has been received.

In addition, the search unit 30 having received an additional symbol may detect whether or not one path continuous with the path being followed until immediately before the additional symbol is received is determined. When one path is determined, the search unit 30 then outputs the output symbol allocated to the determined path. When the paths are not determined, the search unit 30 may output no output symbol or may output an output symbol representing null.

For example, in the state of 9 or 10, two paths continuous with the path, being followed until, immediately before an additional symbol is received diverge, and thus are not determined. In other words, in the state of 9 or 10, it has not determined which of "street" and "stomach" is to be output. Thus, when the search unit 30 in the state of 9 or 10 has received an additional symbol, the search unit 30 outputs no output symbol or outputs an output symbol representing null.

In addition, in a state other than 9 and 10, one path continuous with the path being followed until immediately before an additional symbol is received is determined. Thus, when the search unit 30 in a state other than 9 and 10 has received an additional symbol, the search unit 30 outputs an output symbol allocated to the determined path.

Figure 10:
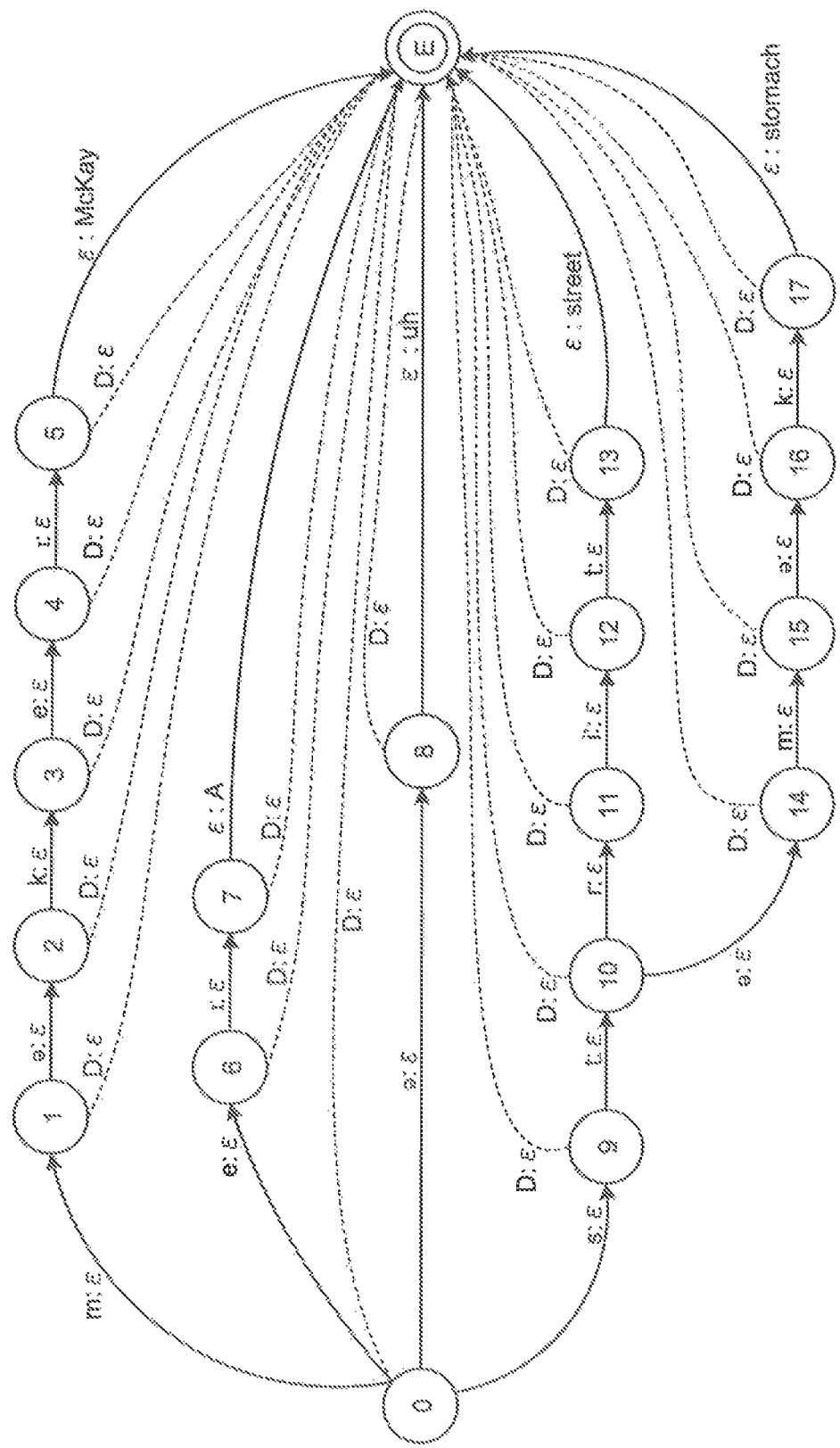
FIG. 10 is a diagram illustrating a search model in which in which reception of an additional symbol causes transition to an end point.

FIG. 10 is a diagram illustrating an example of a search model for recognizing English speech, in which reception of an additional symbol causes transition to a path end point.

When the search unit 30 has received an additional symbol, the search unit 30 may move the search position to the end point of the paths included in the search model. For example, in a case where the search model is WFST, the search unit 30 having received an additional symbol may shift the state of the path to an end state in the WFST. This also allows the search unit 30, having received the additional symbol, to start searching for a path associated with a new output symbol from the next score vector after the score vector including the received additional symbol.

For example, when the pronunciation as shown in Table 2 above is uttered, the search unit 30 can shift the state to follow 0→9→10→E→0→8→E→0→1→2→3→4→5→E→0→9→10→11→12→13→E. As a result, the search unit 30 is capable of outputting "McKay street" as the output symbol, which is correct recognition.

For example, a path for receiving an additional symbol may be added in advance in the search model. For example, in a case where the search model is the WFST, a second edge connecting each of the states other than the end state with the end state may be added in advance in the WFST. In this case, an additional symbol is allocated as an input symbol to each of the second edges. This allows the search unit 30 having received an additional symbol to shift the state of the path to the end state in the WFST.

Alternatively, a path for receiving an additional symbol may not be added in the search model. In this case, the search unit 30 determines whether or not an additional symbol is received each time search for a path is processed. When the search unit 30 has received an additional symbol, the search unit 30 then forcibly moves the search position to the path end point regardless of the paths in the search model. For example, in a case where the search model is WFST, the search unit 30 having received an additional symbol shifts the state of the path to the end state in the WFST regardless of the edges in the WFST. This allows the search unit 30 having received an additional symbol to shift the state of the path to the end state in the WFST.

Note that end information indicating the end may be added to the state at the end of each of words included in the search model. In this case, the search unit 30 having received an additional symbol may move the search position to the state where the end information is added. Alternatively, the search unit 30 may store the number representing the state at the end of each of the words included in the search model, and move the search position to the state with the stored number each time an additional symbol is received.

In addition, in a case where the search unit 30 moves the search position to the end point of the paths included in the search model, the search unit 30 may also output the same symbols as those in FIGS. 6 to 9.

As described above, upon receiving an additional symbol representing at least one of a filler, a disfluency, and a non-speech sound as an input symbol from which a likely acoustic score is obtained, the speech recognition device 10 according to the embodiment start searching for a path associated with a new output symbol from the next score vector after the score vector including the received additional symbol. This allows the speech recognition device 10 according to the embodiment to recognize speech signals containing fillers, disfluencies, and non-speech sounds as well as phonetic units with high accuracy through very simple processes without significantly changing existing search models.

Figure 11:
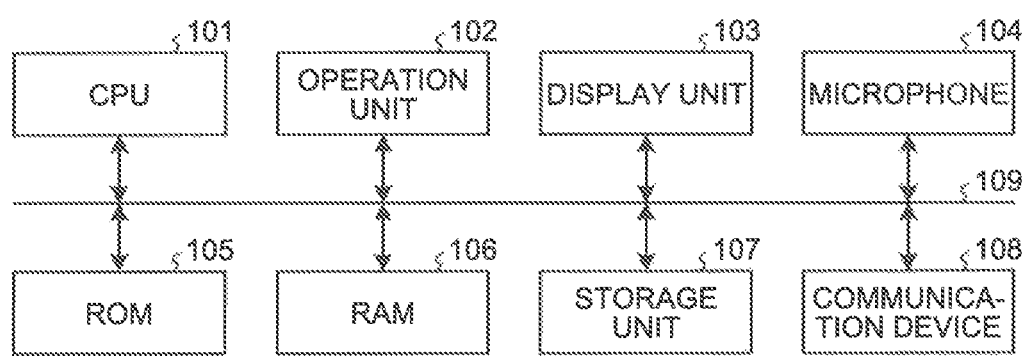
FIG. 11 is a hardware block diagram of the speech recognition device.

FIG. 11 is a hardware block diagram of the speech recognition device 10. The speech recognition device 10 is implemented by a hardware configuration similar to that of a common computer (information processing device), for example. The speech recognition device 10 includes a central processing unit (CPU) 101, an operation unit 102, a display unit 103, a microphone 104, a read only memory (ROM) 105, a random access memory (RAM) 106, a storage unit 107, a communication device 108, and a bus 109. The respective units are connected by the bus 109.

The CPU 101 performs various processes in cooperation with various programs stored in advance in the ROM 105 or the storage unit 107 and using a predetermined area in the RAM 106 as a work area, and generally controls operations of the units (the feature extraction unit 22, the score calculation unit 26, and the search unit 30) constituting the speech recognition device 10. The CPU 101 also implements the operation unit 102, the display unit 103, the microphone 104, the communication device 108, and the like in cooperation with programs stored in advance in the ROM 105 or the storage unit 107.

The operation unit 102 is an input device such as a mouse and a keyboard, which receives information input by a user's operation as an instruction signal and outputs the instruction signal to the CPU 101.

The display unit 103 is a display device such as a liquid crystal display (LCD). The display unit 103 displays various information data on the basis of a display signal from the CPU 101. For example, the display unit 103 displays output symbols and the like. Note that the speech recognition device 10 need not include the display unit 103 in a case where output symbols and the like are output to the communication device 108, the storage unit 107 or the like.

The microphone 104 is a device to input speech signals. The speech recognition device 10 need not include the microphone 104 in a case where pattern recognition of speech signals recorded in advance or speech signals input from the communication device 108 is performed.

The ROM 105 stores programs, various setting information data and the like to be used for control of the speech recognition device 10 in a non-rewritable manner. The RAM 106 is a volatile storage medium such as a synchronous dynamic random access memory (SDRAM). The RAM 106 functions as a work area of the CPU 101. Specifically, the RAM 106 functions as a buffer or the like to temporarily store various variables, parameters, and the like to be used by the speech recognition device 10.

The storage unit 107 is a rewritable recording device such as a storage medium of a semiconductor such as a flash memory, or a magnetically or optically recordable storage medium. The storage unit 107 stores programs, various setting information data, and the like to be used for control of the speech recognition device 10. The storage unit 107 also stores information stored by the acoustic model storage unit 24, the search model storage unit 28, and the like.

The communication device 108 is used to communicate with external devices and output output symbols, additional symbols, and the like. The speech recognition device 10 need not include the communication device 108 in a case where pattern recognition of speech signals recorded in advance or speech signals input from the microphone 104 is performed and where output symbols, additional symbols and the like are output to the display unit 103 or the storage unit 107.

Programs to be executed by the speech recognition device 10 of the embodiment are recorded on a computer readable recording medium such as a CD-ROM, a flexible disk (FD), a CD-R, or a digital versatile disk (DVD) in a form of files that can be installed or executed, and provided therefrom.

Alternatively, programs to be executed by the speech recognition device 10 of the embodiment may be stored on a computer system connected to a network such as the Internet, and provided by being downloaded via the network. Alternatively, the programs to be executed by the speech recognition device 10 of the embodiment may be provided or distributed through a network such as the Internet. Still alternatively, the programs to be executed by the speech recognition device 10 of the embodiment may be embedded in a ROM or the like in advance and provided therefrom.

The programs to be executed by the speech recognition device 10 of the embodiment have a modular structure including a feature extraction module, a score calculation module, and a search module as described above. The CPU 101 (processor) reads the programs from the storage medium or the like and executes the programs, whereby the respective units are loaded on a main storage device and the feature extraction unit 22, the score calculation unit 26, and the search unit 30 are generated on the main storage device. Note that some or all of the feature extraction unit 22, the score calculation unit 26, and the search unit 30 may be implemented by hardware.

While a certain embodiment has been described, the embodiment has been presented by way of example only, and is not intended to limit the scope of the inventions. Indeed, the novel embodiment described herein may be embodied in a variety of other forms; furthermore, various omissions, substitutions and changes in the form of the embodiment described herein may be made without departing from the spirit of the inventions. The accompanying claims and their equivalents are intended to cover such forms or modifications as would fall within the scope and spirit of the inventions.

What is claimed is:

1. A speech recognition device that outputs an output symbol representing linguistic information contained in a speech signal, the device comprising:
   one or more processors configured to:
     calculate a score vector sequence based on the speech signal, the score vector sequence being an arrangement of score vectors including an acoustic score of each of input symbols being elements of a predetermined symbol set;
     search a trained search model in a memory device coupled to the one or more processors, the search model being registered in advance to detect a path following the input symbol from which a likely acoustic score in the score vector sequence is obtained; and
     output an output symbol allocated to the detected path in the search model,
   wherein
     the symbol set includes, as the input symbol, a symbol to be recognized representing a phonetic unit to be recognized, and an additional symbol representing at least one of a filler, a disfluency, and a non-speech sound,
     the search model includes an input symbol string arranging one or more input symbols, and a plurality of paths to each of which an output symbol is allocated, and
     when the additional symbol is received as the input symbol from which the likely acoustic score is obtained, the one or more processors start searching for a path associated with a new output symbol from a next score vector after the score vector including the received additional symbol.

2. The device according to claim 1, wherein when the additional symbol is received, the one or more processors move a searching position to a starting point of the paths included in the search model.

3. The device according to claim 2, wherein
   the search model is a finite state transducer, and
   when the additional symbol is received, the one or more processors shift a state of a path to an initial state in the finite state transducer.

4. The device according to claim 1, wherein when the additional symbol is received, the one or more processors move a searching position to an end point of the paths included in the search model.

5. The device according to claim 4, wherein
   the search model is a finite state transducer, and
   when the additional symbol is received, the one or more processors shift a state of a path to an end state in the finite state transducer.

6. The device according to claim 1, wherein when the additional symbol is received, the one or more processors output no output symbol or output an output symbol representing null.

7. The device according to claim 1, wherein when the additional symbol is received, the one or more processors output a symbol representing the additional symbol.

8. The device according to claim 1, wherein when the additional symbol is received, the one or more processors output the input symbol string received from a starting position of a path until the additional symbol is received.

9. The device according to claim 1, wherein when the additional symbol is received, the one or more processors output an output symbol of a path continuous with a path being followed until immediately before the additional symbol is received.

10. The device according to claim 1, wherein
    when the additional symbol is received, the one or more processors detect whether one path continuous with a path being followed until immediately before the additional symbol is received is determined,
    if one path is determined, the one or more processors output an output symbol allocated to the determined path, and
    if one path is not determined, the one or more processors output no output symbol or output an output symbol representing null.

11. The device according to claim 1, wherein the search model additionally includes in advance a path to receive the additional symbol.

12. The device according to claim 1, wherein
    the search model has no additional path to receive the additional symbol, and
    the one or more processors determine whether the additional symbol is received each time search for a path is processed.

13. A speech recognition method for outputting an output symbol representing linguistic information contained in a speech signal, the method comprising:

calculating a score vector sequence based on the speech signal using one or more processors, the score vector sequence being an arrangement of score vectors including an acoustic score of each of input symbols being elements of a predetermined symbol set;

searching a trained search model in a memory device coupled to the one or more processors, the search model being registered in advance to detect a path following the input symbol from which a likely acoustic score in the score vector sequence is obtained; and outputting an output symbol allocated to the detected path in the search model, wherein the symbol set includes, as the input symbol, a symbol to be recognized representing a phonetic unit to be recognized, and an additional symbol representing at least one of a filler, a disfluency, and a non-speech sound, the search model includes an input symbol string arranging one or more input symbols, and a plurality of paths to each of which an output symbol is allocated, and when the additional symbol is received as the input symbol from which the likely acoustic score is obtained, searching for a path associated with a new output symbol from a next score vector after the score vector including the received additional symbol is started.

14. A non-transitory computer-readable medium comprising a computer program that causes an information processing device to function as a speech recognition device that outputs an output symbol representing linguistic information contained in a speech signal, the computer program causing the device to function as:

a calculation unit configured to calculate a score vector sequence based on the speech signal using one or more processors, the score vector sequence being an arrangement of score vectors including an acoustic score of each of input symbols being elements of a predetermined symbol set; and a search unit configured to:

search a trained search model in a memory device coupled to the one or more processors, the search model being registered in advance to detect a path following the input symbol from which a likely acoustic score in the score vector sequence is obtained, and output an output symbol allocated to the detected path in the search model, wherein the symbol set includes, as the input symbol, a symbol to be recognized representing a phonetic unit to be recognized, and an additional symbol representing at least one of a filler, a disfluency, and a non-speech sound, the search model includes an input symbol string arranging one or more input symbols, and a plurality of paths to each of which an output symbol is allocated, and when the additional symbol is received as the input symbol from which the likely acoustic score is obtained, the search unit starts searching for a path associated with a new output symbol from a next score vector after the score vector including the received additional symbol.

15. The device according to claim 1, wherein to calculate the score vector sequence, the one or more processors are configured to apply a recurrent neural network having a connection list to a temporal classification.

16. The device according to claim 3 wherein the finite state transducer is a weighted finite state transducer performing a Viterbi path search; and the one or more processors are configured to search the search model and output the output symbol at the same time.

17. The device according to claim 1, wherein the memory device is a RAM device coupled with the one or more processors via a bus.

18. The device according to claim 1, wherein the non-speech sound comprises at least one of a cough, a sneeze, a yawn, laughter, a cry, or a breath sound.

19. The device according to claim 1, further comprising a microphone configured to capture the speech signal, the microphone being coupled with the one or more processors.

20. The device according to claim 1, wherein the one or more processors are further configured to:

detect a plurality of successive symbols in the input model string;

delete redundant symbols in the plurality of successive symbols; and delete not recognizable symbols from the plurality of successive symbols.

* * * * *